United States Patent
Huebner et al.

(10) Patent No.: US 10,564,261 B2
(45) Date of Patent: Feb. 18, 2020

(54) AUTONOMOUS VEHICLE LIDAR MIRROR

(71) Applicant: Ford Global Technologies, LLC, Dearborn, MI (US)

(72) Inventors: Annette Lynn Huebner, White Lake, MI (US); Paul Kenneth Dellock, Northville, MI (US); Stuart C. Salter, White Lake, MI (US); Kristin Ann Hellman, Walled Lake, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 454 days.

(21) Appl. No.: 15/592,263

(22) Filed: May 11, 2017

(65) Prior Publication Data

US 2018/0329036 A1 Nov. 15, 2018

(51) Int. Cl.
| | |
|---|---|
| *G01S 7/00* | (2006.01) |
| *G01S 7/481* | (2006.01) |
| *B60R 1/12* | (2006.01) |
| *G01S 17/93* | (2020.01) |
| *B60R 1/06* | (2006.01) |
| *G02B 5/26* | (2006.01) |
| *B29C 45/00* | (2006.01) |
| *B29K 77/00* | (2006.01) |
| *B29K 105/16* | (2006.01) |
| *B29K 507/04* | (2006.01) |
| *B29L 31/30* | (2006.01) |

(52) U.S. Cl.
CPC ............ *G01S 7/4813* (2013.01); *B60R 1/06* (2013.01); *B60R 1/12* (2013.01); *G01S 17/936* (2013.01); *G02B 5/26* (2013.01); *B29C 45/0001* (2013.01); *B29K 2077/00* (2013.01); *B29K 2105/16* (2013.01); *B29K 2507/04* (2013.01); *B29K 2995/0005* (2013.01); *B29L 2031/3005* (2013.01); *B60R 2001/1223* (2013.01)

(58) Field of Classification Search
USPC ................................................ 356/4.01, 5.01
See application file for complete search history.

(56) References Cited

U.S. PATENT DOCUMENTS

| | | | |
|---|---|---|---|
| 6,081,237 A | 6/2000 | Sato et al. | |
| 7,772,966 B2 | 8/2010 | Turnbull et al. | |
| 9,285,464 B2 | 3/2016 | Pennecot et al. | |
| 9,420,264 B2 | 8/2016 | Gilliland et al. | |
| 2010/0001897 A1* | 1/2010 | Lyman | G01S 7/03 |
| | | | 342/70 |
| 2012/0268311 A1* | 10/2012 | Lynam | G01S 17/023 |
| | | | 342/70 |

(Continued)

FOREIGN PATENT DOCUMENTS

WO  2016126626 A1  8/2016

Primary Examiner — James R Hulka
(74) Attorney, Agent, or Firm — Vichit Chea; Price Heneveld LLP

(57) ABSTRACT

A mirror assembly is coupled to a vehicle and includes a light detection and ranging (LIDAR) sensor, a mirror, and a metallized cover. A conductive mirror base is coupled to the LIDAR sensor, mirror, and metallized cover to form the mirror assembly. The mirror and metallized cover are each grounded to the conductive mirror base where the mirror and metallized cover each help to shield the LIDAR sensor from electromagnetic interference.

14 Claims, 5 Drawing Sheets

(56) References Cited

U.S. PATENT DOCUMENTS

| | | | |
|---|---|---|---|
| 2014/0142219 A1* | 5/2014 | Akita | C08L 21/00 |
| | | | 523/436 |
| 2015/0123838 A1* | 5/2015 | Shi | G01S 7/025 |
| | | | 342/70 |
| 2016/0191863 A1* | 6/2016 | Minikey, Jr. | H04N 5/2252 |
| | | | 348/148 |
| 2016/0282468 A1 | 9/2016 | Gruver et al. | |
| 2017/0201661 A1* | 7/2017 | Conger | H04N 5/2257 |

* cited by examiner

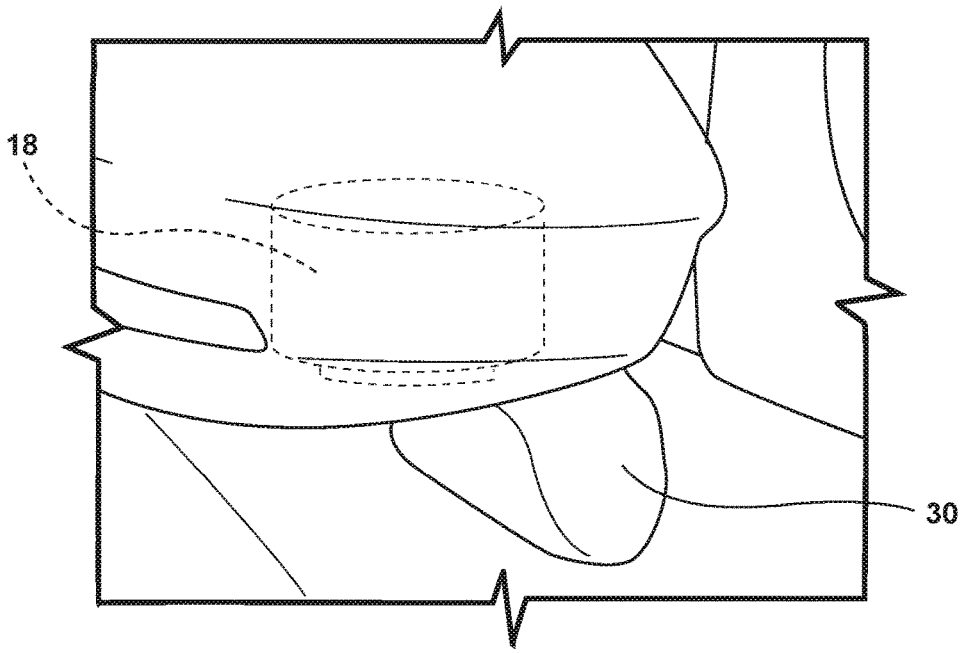
FIG. 6
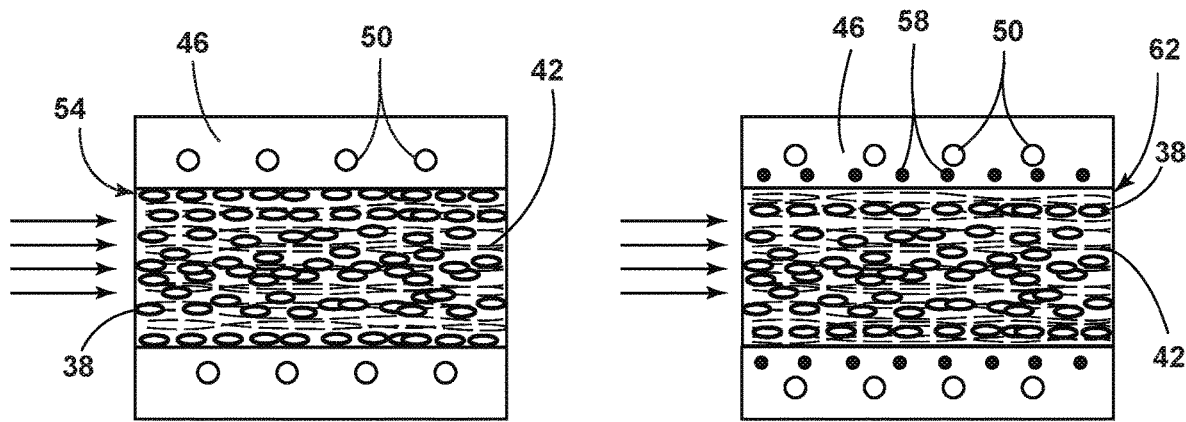
FIG. 7A
FIG. 7B

AUTONOMOUS VEHICLE LIDAR MIRROR

FIELD OF THE INVENTION

The present invention generally relates to a light detection and ranging (LIDAR) device, and more particularly, to a LIDAR device enclosed in a mirror assembly that helps prevent electromagnetic interference.

BACKGROUND OF THE INVENTION

Vehicles can be configured to operate in an autonomous mode where the vehicle navigates through an environment with little to no input from a driver. Such autonomous vehicles can include one or more sensors that are configured to detect information about the environment in which the vehicle maneuvers and operates.

One such sensor may include a light detection and ranging (LIDAR) system that measures distance by illuminating a target with a laser light. Such a laser light may exist in the mirror-infrared and/or infrared wavelength band of the electromagnetic spectrum. A laser, or set of lasers, can be rapidly and repeatedly scanned across a scene to provide continuous real time information on distances to reflective objects in the scene. Combining the measured distances and the orientation of the lasers while measuring each distance allows for the production of a three-dimensional grid with each returning pulse. In this way, a three dimensional map of points representing the surroundings indicate the respective environment that the vehicle is maneuvering through.

SUMMARY OF THE INVENTION

According to one aspect of the present invention, a mirror assembly for a vehicle is provided. The mirror assembly includes a light detection and ranging (LIDAR) sensor, a mirror, a metallized cover, and a conductive mirror base coupled to the LIDAR sensor, mirror, and metallized cover to form the mirror assembly. The mirror and metallized cover are each grounded to the conductive mirror base to help shield the LIDAR sensor from electromagnetic interference.

According to another aspect of the present invention, a method of making a mirror assembly for a vehicle is provided. The method includes injection molding a conductive thermoplastic polymer composition into a hot mold, circulating cold water through the hot mold to form a conductive mirror base, coupling the conductive mirror base to a light detection and ranging (LIDAR) sensor, a mirror, and a metallized cover to form the mirror assembly, and shielding the LIDAR sensor from electromagnetic interference using the mirror and metallized cover.

According to yet another aspect of the present invention, a mirror assembly for a vehicle is provided. The mirror assembly includes a conductive mirror base coupled to a light detection and ranging (LIDAR) sensor, a vacuum metallized mirror, and a vacuum metallized cover to form the mirror assembly. The vacuum metallized mirror and vacuum metallized cover are each grounded to the conductive mirror base through adhesively coupled leads.

These and other aspects, objects, and features of the present invention will be understood and appreciated by those skilled in the art upon studying the following specification, claims, and appended drawings. It will also be understood that features of each embodiment disclosed herein may be used in conjunction with, or as a replacement for, features of the other embodiments.

BRIEF DESCRIPTION OF THE DRAWINGS

In the drawings:

FIG. 6 is an expanded view of a conductive mirror base shown in FIG. 3 according to some embodiments of the present disclosure;

FIG. 7A is a partial schematic cross-sectional view of an injection mold designed to produce a resin rich layer at a surface according to some embodiments of the present disclosure;

FIG. 7B is a partial schematic cross-sectional view of a temperature controlled injection mold designed to produce a conductive particle rich layer at a surface according to some embodiments of the present disclosure.

DETAILED DESCRIPTION OF THE PREFERRED EMBODIMENTS

Figure 1:
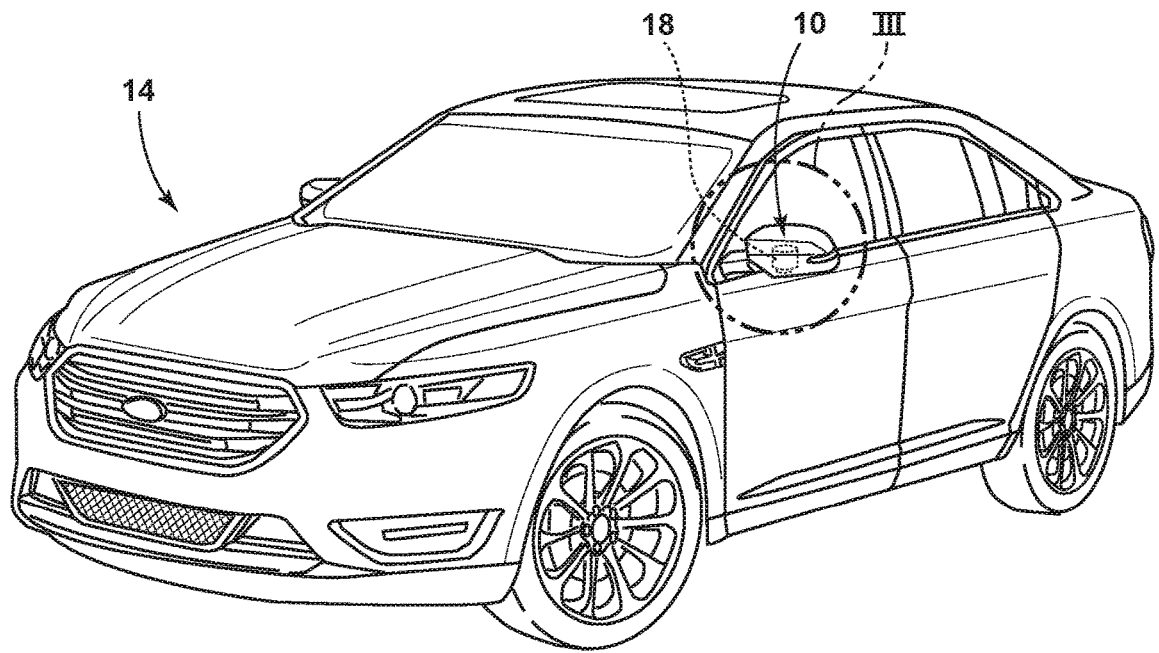
FIG. 1 is a front perspective view of a vehicle having a mirror assembly according to some embodiments of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Light detection and ranging, referred to herein as LIDAR, is an active sensing system that measures the distance of an object by measuring the time difference between the emission and reflection of light. It is important that the LIDAR sensors used on a vehicle to detect objects on the road have a clear unobstructed view of the road in all directions surrounding the vehicle. The first autonomous vehicles mounted LIDAR sensors on top of the roof. These roof mounted sensors were unappealing and easy to damage. The present disclosure provides options to hide the LIDAR sensors and/or mount the LIDAR sensors at different positions on a vehicle while preserving the look of the vehicle. Unlike radar which uses electromagnetic energy in the radio frequency range, LIDAR uses light waves. In LIDAR, a pulse of light in the near visible UV to near visible IR range is emitted and the precise timing is recorded. The reflection of the pulse is detected and recorded. Using the speed of light, the delay can be converted and a slant range distance can be calculated. Knowing the position and orientation of this sensor, the XYZ coordinate of the object can be calculated.

Referring to FIGS. 1-7B, reference numeral 10 generally designates a mirror assembly shown as an exterior side view mirror assembly. The mirror assembly 10 is coupled to a wheeled motor vehicle 14 and includes a light detection and ranging (LIDAR) sensor 18, a mirror 22, and a metallized cover 26. A conductive mirror base 30 is mechanically or electrically coupled to the LIDAR sensor 18, mirror 22, and metallized cover 26 to form the mirror assembly 10. The mirror 22 and metallized cover 26 are each grounded to the conductive mirror base 30 where the mirror 22 and metallized cover 26 each help to shield the LIDAR sensor 18 from electromagnetic interference.

Referring now to FIG. 1, the vehicle 14 is shown for example as a car, but it will be understood that the disclosure herein may equally be applied to trucks, vans, motorcycles, construction equipment, commercial vehicles, and the like without departing from the teachings provided herein. The vehicle 14 includes two mirror assemblies 10 coupled to the frame of the front doors of the vehicle 14 on opposite lateral sides. Each of the mirror assemblies 10 include one LIDAR sensor 18 positioned to project a laser light out into the surroundings of the vehicle 14. The LIDAR sensor 18 may be located elsewhere on the vehicle 14 and may project light into any region surrounding the vehicle 14 to detect objects.

Figure 2:
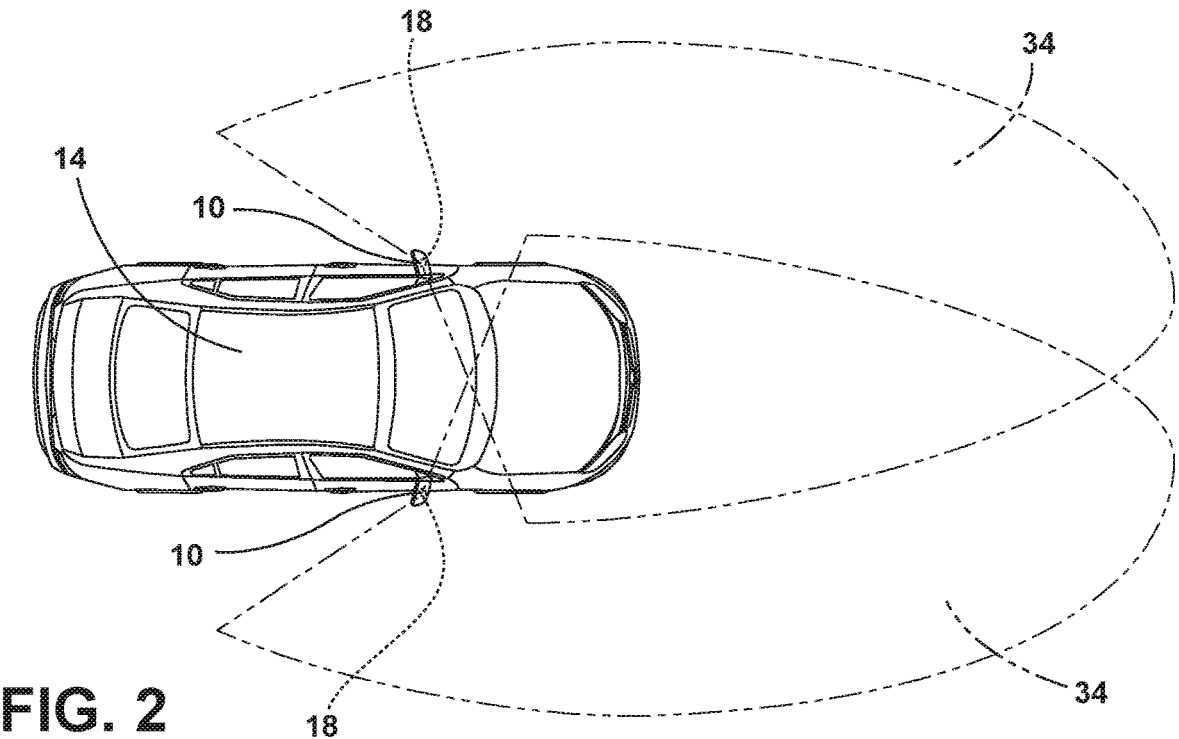
FIG. 2 is a top view of the vehicle of FIG. 1 including a coverage area provided by the mirror assembly according to some embodiments of the present disclosure.

Referring now to FIG. 2, the mirror assembly 10 will supply coverage area 34 projecting forward from the side mirror assembly 10 of the vehicle 14. Additional sensors and/or LIDAR sensors may be coupled in other positions on the vehicle 14 to help eliminate blind spots. The LIDAR sensors 18 of the mirror assembly 10 will provide coverage for the vehicle 14 as it is moving forward or turning and may be in communication with radar (not shown) and other sensors (not shown) coupled to the vehicle 14.

Figure 3:
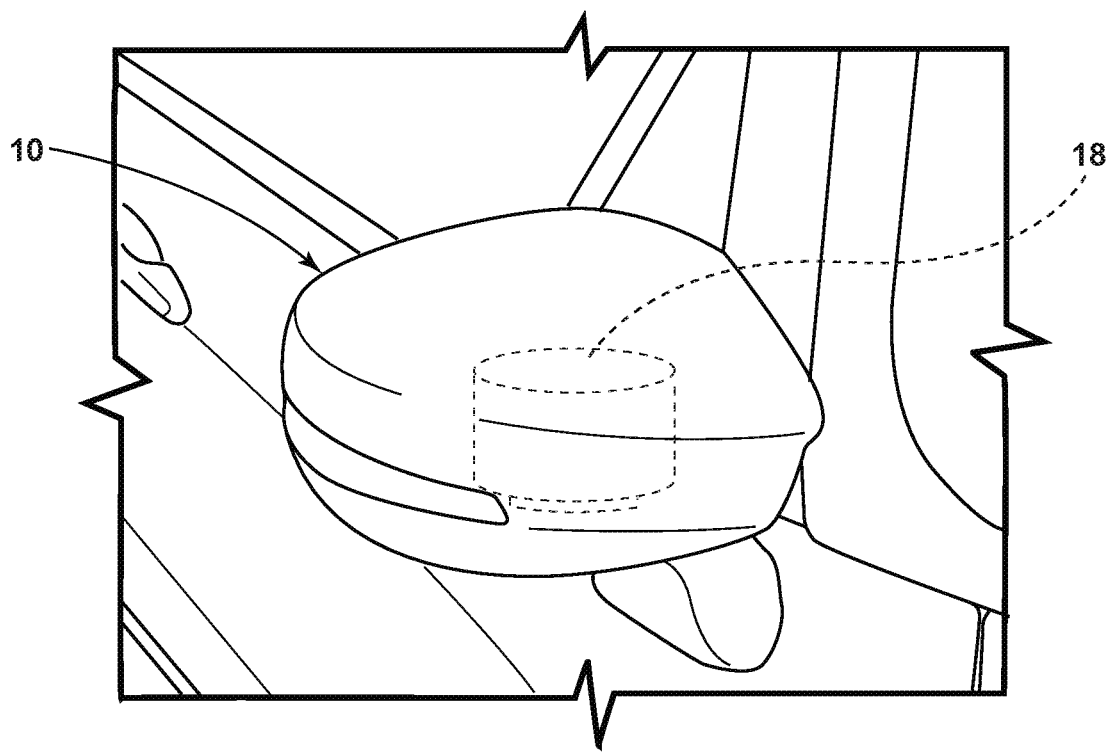
FIG. 3 is an expanded side view of a mirror assembly taken from the vehicle of FIG. 1 along the portion III, according to some embodiments of the present disclosure.

Referring to FIG. 3, an expanded view of the mirror assembly 10 coupled to the vehicle 14 of FIG. 1 along the portion III is shown. The mirror assembly 10 includes a metallized cover 26 that encloses the LIDAR sensor 18.

Figure 4:
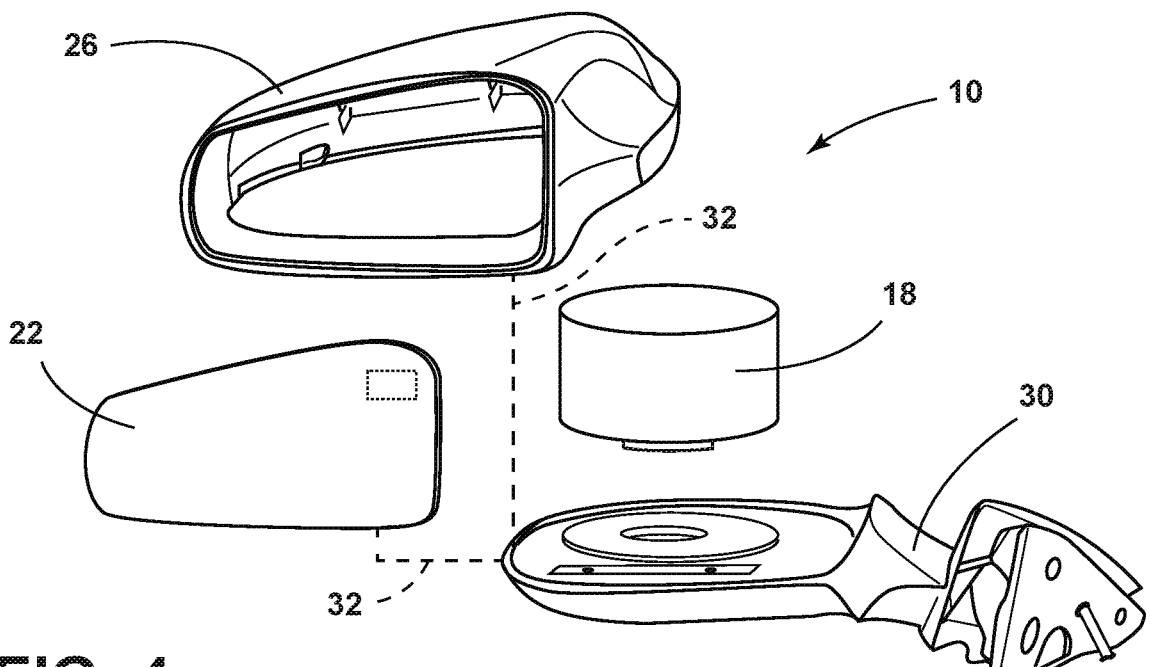
FIG. 4 is an exploded view of the mirror assembly presented in FIG. 3 according to some embodiments of the present disclosure.

Referring now to FIG. 4, an exploded view of the mirror assembly 10 presented in FIG. 3 is shown. The mirror assembly 10 includes the LIDAR sensor 18 enclosed within the mirror 22, the metallized cover 26, and the conductive mirror base 30. Both the mirror 22 and the metallized cover 26 are each coupled to an adhesively bonded lead 32 that is electrically conductive and grounds the mirror 22 and the metallized cover 26 to the conductive mirror base 30. In some embodiments, the mirror 22 is a vacuum metallized mirror. In some embodiments, the metallized cover 26 is a vacuum metallized plastic housing.

The mirror 22 may be a glass that is vacuum metallized on the inside surface with an aluminum, silver, indium, and/or other reflective metal. This vacuum metallized coating produces a reflective surface that meets regulatory requirements. In some autonomous vehicle embodiments, the mirror 22 may be fixed and cannot be adjusted since the vehicle will be driven and operated autonomously. The vacuum metallized glass used for the mirror 22 has leads adhesively attached with a conductive tape and/or adhesive on a back surface of the metallized mirror surface of the mirror 22. The leads are attached to the conductive mirror base 30 so they are grounded. The vacuum metallized glass of the mirror 22 provides shielding to the LIDAR sensor 18 from electromagnetic interference (EMI). In some embodiments, the conductive vacuum metallized surface of the mirror 22 acts as an EMI shield. In some embodiments, the mirror 22 and metallized cover 26 are each coupled to an adhesively bonded lead to ground the mirror 22 and metallized cover 26 to the conductive mirror base 30.

The metallized cover 26 can be a vacuum metallized plastic housing injection molded from a clear polymer and then vacuum metallized. In some embodiments, the polymer of the metallized cover 26 includes polyethylene terephthalate, nylons, polyacetals, polyacrylates, polycarbonates, polyethylene, low density polyethylene, high density polyethylene, polystyrene, polysulfone, polyvinylchloride, ultra-high molecular weight polyethylene, polytetrafluorethylene, polyether ether ketone, or combinations thereof. In some embodiments, the metallized cover 26 includes polycarbonate, acrylate, or nylon polymers. The inside surface of the metallized cover 26 may be vacuum metallized using aluminum, silver, indium, or other reflective metal. The vacuum metallized coating of the metallized cover 26 may have a thickness of about two nanometers to about four nanometers which is thin enough to allow visible light to pass through the metallized coating.

The vacuum metallized coating of the mirror 22 and/or metallized cover 26 can serve multiple purposes. First, the metallization can provide a decorative surface and partially hide the LIDAR sensor 18 positioned in the mirror assembly 10. Second, the metallization can shield the LIDAR sensor 18 from electromagnetic interference provided that the metallized surface is grounded to the conductive mirror base 30. The metallized surface of the mirror 22 and/or metallized cover 26 can allow 70% or more of near visible light to pass through the mirror 22 and/or metallized cover 26 allowing the LIDAR sensor 18 to function while shielding the LIDAR sensor 18 from unwanted radio frequency waves.

Figure 5:
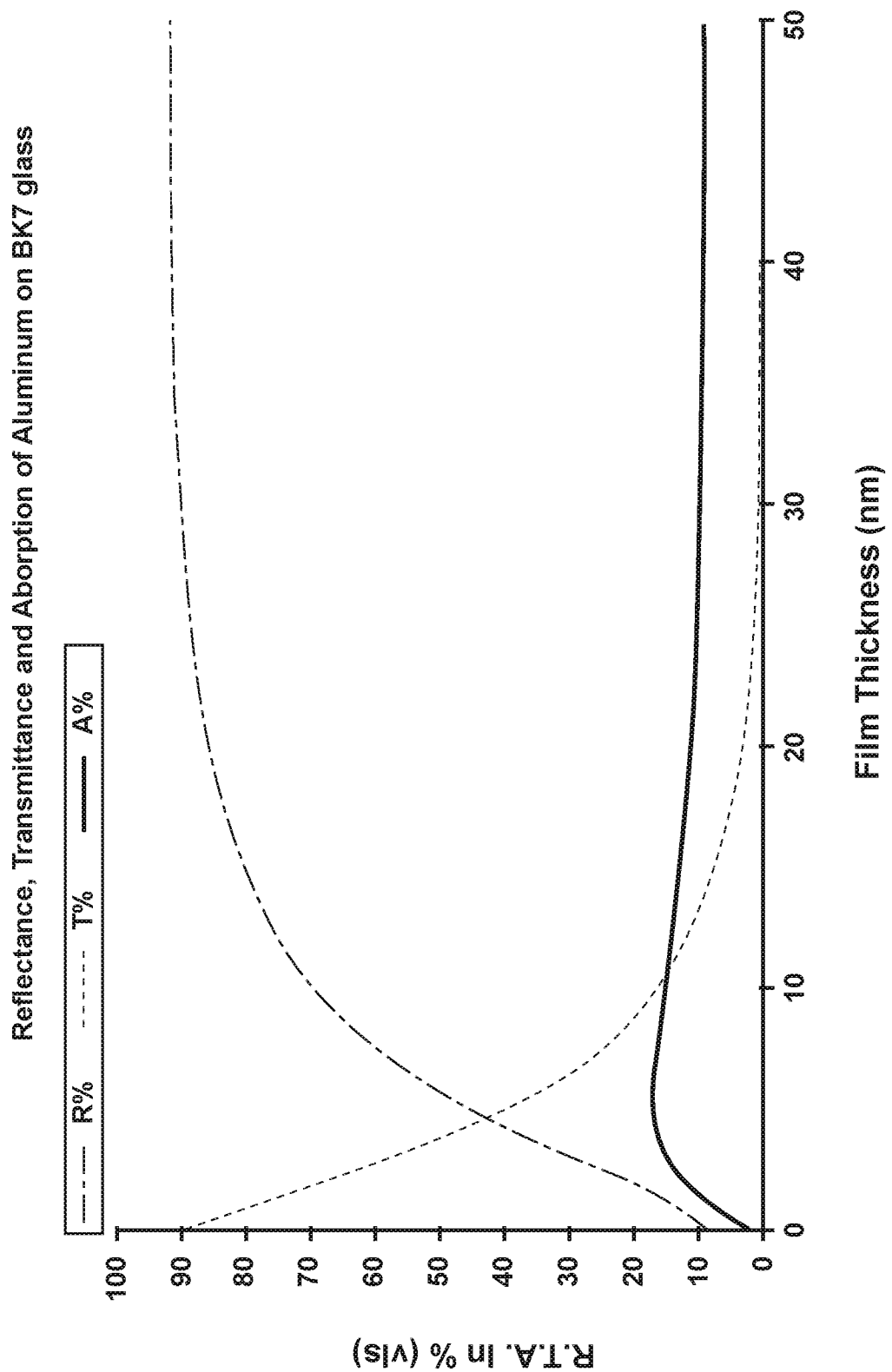
FIG. 5 is a graph showing the reflectance, transmittance, and absorption of aluminum on glass according to some embodiments of the present disclosure.
Figure 8:
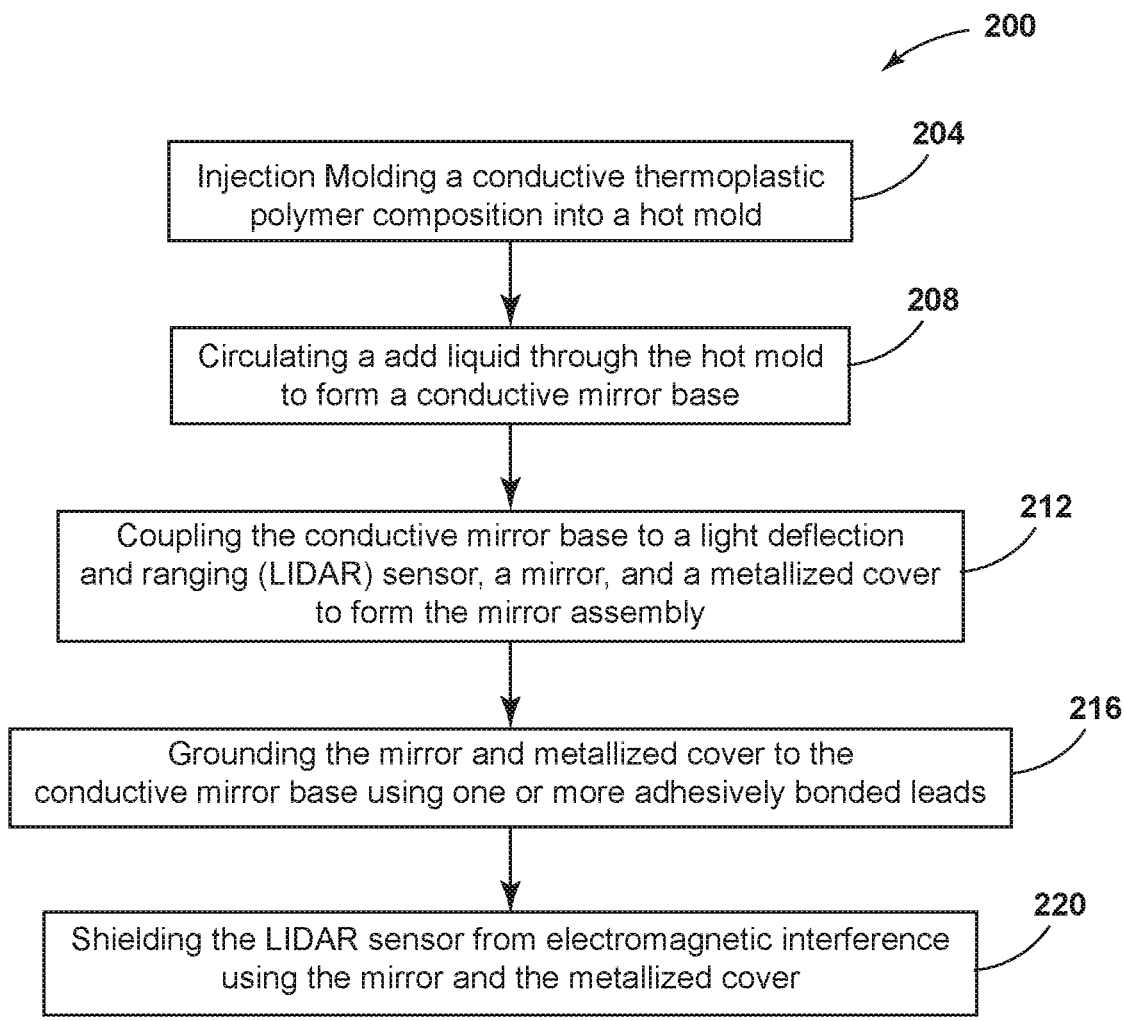
FIG. 8 is a flow diagram of a method of making a mirror assembly for a vehicle according to some embodiments of the present disclosure.

Referring now to FIG. 5, a graph is shown displaying the reflectance, transmittance, and absorption of aluminum on glass. The aluminum metallized surface shows an increased reflectance as the film thickness increases while conversely the transmittance decreases as the film thickness gets thicker. In one embodiment, the absorption increases the first five nanometers of thickness but then shoulders off slowly as the film gets thicker.

Referring now to FIG. 6, an expanded view of the conductive mirror base 30 shown in FIG. 3 is shown. The conductive mirror base 30 is made from an electrically conductive polymer material that can be die cast or injection molded where the conductive polymer can be affordably produced and cast while it can also be painted or molded in various colors.

In some embodiments, the conductive mirror base 30 can be produced from nylon 6. Nylon 6 offers relatively stiff mechanical properties and can be doped with various fillers to adjust the stiffness and resistivity. Unmodified nylon has a high volume resistivity and surface resistivity. The surface resistivity of nylon is about $10^{16}$ ohm·centimeter while the volume resistivity is about $10^{16}$ ohm·centimeter using ASTM D257 test methodology. In some embodiments, adding high purity graphite to the nylon 6 improves the conductivity of the polymer from $10^{16}$ ohm·centimeter to less than $10^2$ ohm·centimeter. In some embodiments, adding chopped carbon fiber that is six millimeters long to the polymer 38 having 30% by weight nylon increases the Young's modulus to about 18-20 gigapascal. In some embodiments, the conductive mirror base 30 includes a nylon 6 polymer. In some embodiments, the nylon 6 polymer is doped with graphite and/or carbon fiber. In other embodiments, the nylon 6 polymer has a Young's modulus of at least 15 GPa.

In some embodiments, the conductive mirror base 30 includes a carbon allotrope doped polymer. In some embodiments, the carbon allotrope doped polymer includes polyethylene terephthalate, nylons, polyacetals, polyacrylates, polycarbonates, polyethylene, low density polyethylene, high density polyethylene, polystyrene, polysulfone, polyvinylchloride, ultra-high molecular weight polyethylene, polytetrafluorethylene, polyether ether ketone, or combinations thereof. In these and other embodiments, the carbon allotrope doped polymer includes graphite, graphene, carbon fibers, fullerenes, carbon nanotubes, single-walled carbon nanotubes, multi-walled carbon nanotubes, or combinations thereof.

Referring now to FIG. 7A, with conventional injection molding, resin is injected into a relatively cold tool or a mold 46 having a plurality of water lines 50. When the carbon allotrope doped polymer resin, which includes the polymer 38 and the carbon allotrope 42, is pushed into the mold 46, the carbon allotrope doped polymer resin cools at a rapid pace and a resin rich layer 54 is formed. When injecting the inventive carbon allotrope doped polymer resin into the cold mold 46, there can be very little carbon allotrope or graphite near the surface of the molded conductive mirror base 30 so the outermost layer or resin rich layer 54 of the conductive mirror base 30 is highly insulating in nature. Below the resin rich layer 54 are the conductive particles or carbon allotrope 42 molecules that orient with the flow of the injected carbon allotrope doped polymer resin and forms plates in a laminar nature parallel to the mold walls moving towards the center of the mold 46. The orientation of the conductive particles or carbon allotrope 42 can be more randomized near the center of the molded conductive mirror base 30.

Referring now to FIG. 7B, the carbon allotrope doped polymer resin (polymer 38 and carbon allotrope 42) is injected into the mold 46 having both a plurality of heating elements 58 and the plurality of water lines 50. The mold 46 temperature can be set to the melting point of the carbon allotrope doped polymer resin being injected. Once the mold 46 is filled with the carbon allotrope doped polymer resin, the plurality of heating elements 58 can be turned off and cold water may be circulated through the mold 46 through the plurality of water lines 50 to slowly and controllably cool the carbon allotrope doped polymer resin to form the conductive mirror base 30. By slowly cooling the carbon allotrope doped polymer resin, a conductive particle rich layer 62 can be selectively formed near the outmost layer or surface of the conductive mirror base 30 so the conductive mirror base 30 is highly conductive in nature. In some embodiments, the temperature of the mold 46 may be controlled by alternating the engagement of the heating elements 58 and the plurality of water lines 50 to give an alternating heating and cooling cycle, a ramped temperature cycle, or a stepped temperature program to control the formation of the conductive particle rich layer 62 with the carbon allotrope 42 selectively positioned at the outmost layer or surface of the conductive mirror base 30.

Referring now to FIGS. 1-8, the method 200 for making the mirror assembly 10 for the vehicle 14 is shown. The method 200 includes injection molding the conductive thermal plastic polymer composition into a hot mold (step 204) and circulating a cold liquid through the hot mold to form the conductive mirror base 30 (step 208). The method also includes coupling the conductive mirror base 30 to the light detection and ranging (LIDAR) sensor, the mirror 22, and the metallized cover 26 to form the mirror assembly 10 (step 212). The method further includes grounding the mirror 22 and the metallized cover 26 to the conductive mirror base 30 using one or more adhesively bonded leads (step 216). Lastly, the method includes shielding the LIDAR sensor 18 from electromagnetic interference using the mirror 22 and the metallized cover 26 (step 220).

It is understood that the descriptions outlining and teaching the mirror assembly 10 previously discussed, which can be used in any combination, apply equally well to the second embodiment, where applicable, further disclosing a method of forming the mirror assembly 10.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

Listing of Non-Limiting Embodiments

Embodiment A is a mirror assembly for a vehicle comprising a light detection and ranging (LIDAR) sensor; a mirror; a metallized cover; and a conductive mirror base coupled to the LIDAR sensor, mirror, and metallized cover to form the mirror assembly, wherein the mirror and the metallized cover are each grounded to the conductive mirror base to help shield the LIDAR sensor from electromagnetic interference.

The mirror assembly of Embodiment A wherein the mirror is a vacuum metallized mirror.

The mirror assembly of Embodiment A or Embodiment A with any of the intervening features wherein the metallized cover is a vacuum metallized plastic housing.

The mirror assembly of Embodiment A or Embodiment A with any of the intervening features wherein the conductive mirror base comprises a carbon allotrope doped polymer.

The mirror assembly of Embodiment A or Embodiment A with any of the intervening features wherein the carbon allotrope doped polymer comprises graphite, graphene, carbon fibers, fullerenes, carbon nanotubes, single-walled carbon nanotubes, multi-walled carbon nanotubes, or combinations thereof.

The mirror assembly of Embodiment A or Embodiment A with any of the intervening features wherein the carbon allotrope doped polymer comprises polyethylene terephthalate, nylons, polyacetals, polyacrylates, polycarbonates, polyethylene, low density polyethylene, high density polyethylene, polystyrene, polysulfone, polyvinylchloride, ultra-high molecular weight polyethylene, polytetrafluorethylene, polyether ether ketone, or combinations thereof.

The mirror assembly of Embodiment A or Embodiment A with any of the intervening features wherein the conductive mirror base comprises a nylon 6 polymer.

The mirror assembly of Embodiment A or Embodiment A with any of the intervening features wherein the nylon 6 polymer is doped with graphite and/or carbon fiber.

The mirror assembly of Embodiment A or Embodiment A with any of the intervening features wherein the nylon 6 polymer has a Young's modulus of at least 15 GPa.

The mirror assembly of Embodiment A or Embodiment A with any of the intervening features wherein the mirror and the metallized cover transmit at least 70% of near visible light to the LIDAR sensor.

The mirror assembly of Embodiment A or Embodiment A with any of the intervening features wherein the mirror and the metallized cover are each coupled to an adhesively bonded lead to ground the mirror and the metallized cover to the conductive mirror base.

Embodiment B is a method of making a mirror assembly for a vehicle, the method comprising: injection molding a conductive thermoplastic polymer composition into a hot mold; circulating cold water through the hot mold to form a conductive mirror base; coupling the conductive mirror base to a light detection and ranging (LIDAR) sensor, a mirror, and a metallized cover to form the mirror assembly; and shielding the LIDAR sensor from electromagnetic interference using the mirror and metallized cover.

The method of Embodiment B further comprising: grounding the mirror and the metallized cover to the conductive mirror base using one or more adhesively bonded leads.

The method of Embodiment B or Embodiment B with any of the intervening features further comprising: circulating cold water alternated with warm water through the hot mold to form the conductive mirror base and position a plurality of conductive particles at a surface of the conductive mirror base.

The method of Embodiment B or Embodiment B with any of the intervening features further comprising: transmitting at least 70% of near visible light through the mirror and the metallized cover to the LIDAR sensor.

The method of Embodiment B or Embodiment B with any of the intervening features wherein the conductive thermoplastic polymer composition comprises graphite, graphene, carbon fibers, fullerenes, carbon nanotubes, single-walled carbon nanotubes, multi-walled carbon nanotubes, or combinations thereof.

The method of Embodiment B or Embodiment B with any of the intervening features wherein the conductive thermoplastic polymer composition comprises polyethylene terephthalate, nylons, polyacetals, polyacrylates, polycarbonates, polyethylene, low density polyethylene, high density polyethylene, polystyrene, polysulfone, polyvinylchloride, ultra-high molecular weight polyethylene, polytetrafluorethylene, polyether ether ketone, or combinations thereof.

Embodiment C is a mirror assembly for a vehicle comprising: a conductive mirror base coupled to a light detection and ranging (LIDAR) sensor, a vacuum metallized mirror, and a vacuum metallized cover to form the mirror assembly; wherein the vacuum metallized mirror and vacuum metallized cover are each grounded to the conductive mirror base through adhesively coupled leads.

The mirror assembly of Embodiment C wherein the vacuum metallized mirror and the vacuum metallized cover each help shield the LIDAR sensor from electromagnetic interference.

The mirror assembly of Embodiment C or Embodiment C with any of the intervening features wherein the mirror and the metallized cover transmit at least 70% of near visible light to the LIDAR sensor.

What is claimed is:
1. A mirror assembly for a vehicle comprising:
a light detection and ranging (LIDAR) sensor;
a mirror;
a metallized cover; and
a conductive mirror base coupled to the LIDAR sensor, mirror, and metallized cover to form the mirror assembly;

wherein the mirror and the metallized cover are each grounded to the conductive mirror base to help shield the LIDAR sensor from electromagnetic interference.

2. The mirror assembly of claim 1, wherein the mirror is a vacuum metallized mirror.

3. The mirror assembly of claim 1, wherein the metallized cover is a vacuum metallized plastic housing.

4. The mirror assembly of claim 1, wherein the conductive mirror base comprises a carbon allotrope doped polymer.

5. The mirror assembly of claim 4, wherein the carbon allotrope doped polymer comprises graphite, graphene, carbon fibers, fullerenes, carbon nanotubes, single-walled carbon nanotubes, multi-walled carbon nanotubes, or combinations thereof.

6. The mirror assembly of claim 4, wherein the carbon allotrope doped polymer comprises polyethylene terephthalate, nylons, polyacetals, polyacrylates, polycarbonates, polyethylene, low density polyethylene, high density polyethylene, polystyrene, polysulfone, polyvinylchloride, ultra-high molecular weight polyethylene, polytetrafluorethylene, polyether ether ketone, or combinations thereof.

7. The mirror assembly of claim 1, wherein the conductive mirror base comprises a nylon 6 polymer.

8. The mirror assembly of claim 7, wherein the nylon 6 polymer is doped with graphite and/or carbon fiber.

9. The mirror assembly of claim 8, wherein the nylon 6 polymer has a Young's modulus of at least 15 GPa.

10. The mirror assembly of claim 1, wherein the mirror and the metallized cover transmit at least 70% of near visible light to the LIDAR sensor.

11. The mirror assembly of claim 1, wherein the mirror and the metallized cover are each coupled to an adhesively bonded lead to ground the mirror and the metallized cover to the conductive mirror base.

12. A mirror assembly for a vehicle comprising:
 a conductive mirror base coupled to a light detection and ranging (LIDAR) sensor, a vacuum metallized mirror, and a vacuum metallized cover to form the mirror assembly;
 wherein the vacuum metallized mirror and vacuum metallized cover are each grounded to the conductive mirror base through adhesively coupled leads.

13. The mirror assembly of claim 12, wherein the vacuum metallized mirror and the vacuum metallized cover each help shield the LIDAR sensor from electromagnetic interference.

14. The mirror assembly of claim 12, wherein the mirror and the metallized cover transmit at least 70% of near visible light to the LIDAR sensor.

* * * * *